United States Patent
Sbeiti et al.

(10) Patent No.: US 11,200,290 B2
(45) Date of Patent: Dec. 14, 2021

(54) USER-ORIENTED INFORMATION SEARCH AND INFORMATION GATHERING

(71) Applicant: DEUTSCHE TELEKOM AG, Bonn (DE)

(72) Inventors: Mohamad Sbeiti, Recklinghausen (DE); Daniel Sayk, Essen (DE); Bernd Weltermann, Essen (DE); Mathias Kloth, Bergisch Gladbach (DE)

(73) Assignee: DEUTSCHE TELEKOM AG, Bonn (DE)

( * ) Notice: Subject to any disclaimer, the term of this patent is extended or adjusted under 35 U.S.C. 154(b) by 230 days.

(21) Appl. No.: 16/477,203

(22) PCT Filed: Jan. 15, 2018

(86) PCT No.: PCT/EP2018/050880
§ 371 (c)(1),
(2) Date: Jul. 11, 2019

(87) PCT Pub. No.: WO2018/130687
PCT Pub. Date: Jul. 19, 2018

(65) Prior Publication Data
US 2019/0361947 A1    Nov. 28, 2019

(30) Foreign Application Priority Data

Jan. 13, 2017   (EP) ..................................... 17151517

(51) Int. Cl.
*G06F 16/9535*   (2019.01)
*G06F 16/23*     (2019.01)
(Continued)

(52) U.S. Cl.
CPC ............ *G06F 16/9535* (2019.01); *G06F 9/54* (2013.01); *G06F 16/2365* (2019.01); *G06F 16/252* (2019.01)

(58) Field of Classification Search
None
See application file for complete search history.

(56) References Cited

U.S. PATENT DOCUMENTS 6,999,959 B1    2/2006  Lawrence et al.
7,577,641 B2 *  8/2009  Koch .................... G06F 16/951
(Continued)

*Primary Examiner* — Uyen T Le
(74) *Attorney, Agent, or Firm* — Leydig, Voit & Mayer, Ltd.

(57) ABSTRACT

A method for user-oriented information search and information gathering using a backend system and a frontend system includes: providing a search query element to the frontend system; generating, initializing, or instantiating an information queue element related to at least one type of relevant information element associated with the search query element; feeding the content of the information queue element to at least one queue consumer element related to the information queue element, wherein potentially relevant information elements are gathered or searched by the at least one queue consumer element related to the information queue element; and feeding the potentially relevant information elements to a processing element. The processing element, by using information stored in a database element, performs a validation on the potentially relevant information elements to obtain relevant information elements.

7 Claims, 2 Drawing Sheets

(51) Int. Cl.
*G06F 16/25* (2019.01)
*G06F 9/54* (2006.01)

(56) References Cited

U.S. PATENT DOCUMENTS

| | | | |
|---|---|---|---|
| 8,694,947 B1* | 4/2014 | Venkataraman! | G06F 30/327 |
| | | | 716/132 |
| 2007/0073708 A1 | 3/2007 | Smith et al. | |
| 2010/0070448 A1* | 3/2010 | Omoigui | H01L 27/14647 |
| | | | 706/47 |
| 2012/0272176 A1* | 10/2012 | Nielsen | G06F 16/9032 |
| | | | 715/779 |
| 2014/0270494 A1* | 9/2014 | Sawhney | G06K 9/6253 |
| | | | 382/159 |
| 2015/0006410 A1* | 1/2015 | Ozluturk | G06Q 50/184 |
| | | | 705/310 |

* cited by examiner

USER-ORIENTED INFORMATION SEARCH AND INFORMATION GATHERING

CROSS-REFERENCE TO RELATED APPLICATIONS

This application is a U.S. National Phase application under 35 U.S.C. § 371 of International Application No. PCT/EP2018/050880, filed on Jan. 15, 2018, and claims benefit to European Patent Application No. EP 17151517.4, filed on Jan. 13, 2017. The International Application was published in English on Jul. 19, 2018 as WO 2018/130687 A1 under PCT Article 21(2).

FIELD

The present invention relates to a method for enhanced and user-oriented information search and information gathering using a backend system and a frontend system, wherein the frontend system comprises an application programming interface and/or a user interface enabling a user to choose and/or to input
  a business domain of the user-oriented information search and information gathering, and
  at least one type of relevant information elements out of a plurality of different types of relevant information elements,
wherein the backend system comprises a plurality of information queue elements, a database element, a processing element, and at least one queue consumer element out of a plurality of different queue consumer elements, wherein each information queue element is related to a type of relevant information elements out of the plurality of different types of relevant information elements, and wherein each information queue element is related to at least one queue consumer element out of a plurality of different queue consumer elements.

Furthermore, the present invention relates to a system for enhanced and user-oriented information search and information gathering using a backend system and a frontend system, wherein the system comprises the backend system and the frontend system, wherein the frontend system comprises an application programming interface and/or a user interface enabling a user to choose and/or to input
  a business domain of the user-oriented information search and information gathering, and
  at least one type of relevant information elements out of a plurality of different types of relevant information elements,
wherein the backend system comprises a plurality of information queue elements, a database element, a processing element, and at least one queue consumer element out of a plurality of different queue consumer elements, wherein each information queue element is related to a type of relevant information elements out of the plurality of different types of relevant information elements, and wherein each information queue element is related to at least one queue consumer element out of a plurality of different queue consumer elements.

Furthermore, the present invention relates to a program comprising a computer readable program code which, when executed on a computer or on a frontend system or a part thereof or on a backend system or a part thereof, or in part on a front end system or a part thereof and in part on a backend system or a part thereof, causes the computer or the frontend system or the backend system to perform a method according to the present invention.

Furthermore, the present invention relates to a computer program product for enhanced and user-oriented information search and information gathering using a backend system and a frontend system, the computer program product comprising a computer program stored on a storage medium, the computer program comprising program code which, when executed on a computer or on a frontend system or a part thereof or on a backend system or a part thereof, or in part on a front end system or a part thereof and in part on a backend system or a part thereof, causes the computer or the frontend system or the backend system to perform a method according to the present invention.

BACKGROUND

Systems and tools for gathering information are a central part of the Information Age and have central roles in numerous technological fields.

One such field (that the invention is in no way limited to) is the field of internet security.

A variety of information gathering tools (like vulnerability scanners) exists. However, such tools share various impediments with respect to the gathering of information.

The tools are usually task-oriented and not user-oriented, i.e., they are implemented for predefined tasks/goals, which cannot be dynamically modified by the user depending on the user's interest. Moreover, such tools often do not feature a configurable information space for input and output, i.e., their output is either pre-defined or depends on the task and/or the target. Often, such tools are also not adaptable for different business domains. The tools also do not feature recursion to gain new information based on their output. Furthermore, the tools do not feature high level description of the user target and scope, e.g., a user can usually not specify (at least not in a user-friendly language) a company/business domain as a target and simultaneously specify other companies or clients of said company as being not in the scope. At the same time, such tools are not well-scalable in terms of integration of other tools and/or other capabilities.

SUMMARY

In an exemplary embodiment, the present invention provides a method for user-oriented information search and information gathering using a backend system and a frontend system. The frontend system comprises an application programming interface and/or a user interface enabling a user to choose and/or to input a business domain of the user-oriented information search and information gathering, and at least one type of relevant information element out of a plurality of different types of relevant information elements. The backend system comprises a plurality of information queue elements, a database element, a processing element, and a plurality of different queue consumer elements, wherein each information queue element is related to a type of relevant information element out of the plurality of different types of relevant information elements, and wherein each information queue element is related to at least one queue consumer element out of the plurality of different queue consumer elements. The method comprises the following steps: in a first step, a search query element is provided to the frontend system, the search query element being related to a business domain and being associated with at least one type of relevant information element; in a second step, subsequent to the first step, an information queue element related to the at least one type of relevant information element associated with the search query element is generated or initialized or instantiated; in a third step, subsequent to the second step, the content of the information queue element is fed to at least one queue consumer element related to the information queue element, wherein potentially relevant information elements are gathered or searched by the at least one queue consumer element related to the information queue element; and in a fourth step, subsequent to the third step, the potentially relevant information elements are fed to the processing element, wherein the processing element, by using information stored in the database element, performs a validation on the potentially relevant information elements to obtain information elements relevant with respect to the business domain and/or with respect to the at least one type of relevant information element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
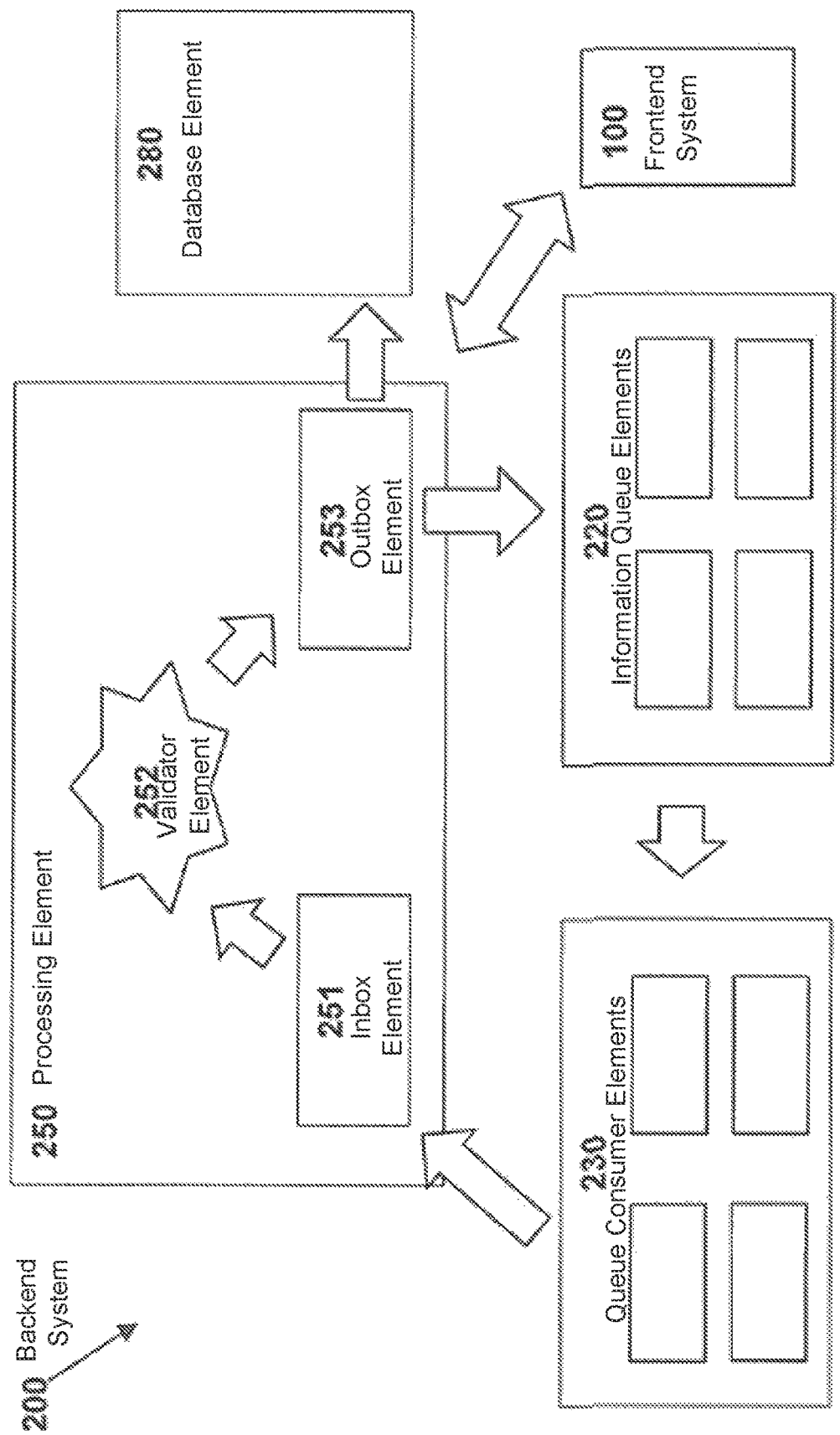
FIG. 1 schematically illustrates a flow diagram according to an embodiment of the present invention.

Exemplary embodiments of the present invention improve the versatility and/or user-friendliness of information search and gathering systems and methods.

In an exemplary embodiment, the present invention provides a method for enhanced and user-oriented information search and information gathering using a backend system and a frontend system,
wherein the frontend system comprises an application programming interface and/or a user interface enabling a user to choose and/or to input
 a business domain of the user-oriented information search and information gathering, and
 at least one type of relevant information elements out of a plurality of different types of relevant information elements,
wherein the backend system comprises a plurality of information queue elements, a database element, a processing element, and at least one queue consumer element out of a plurality of different queue consumer elements, wherein each information queue element is related to a type of relevant information elements out of the plurality of different types of relevant information elements, and wherein each information queue element is related to at least one queue consumer element out of a plurality of different queue consumer elements, wherein the method comprises the following steps:
 in a first step, a search query element is provided, typically by a user of the frontend system, to the user interface of the frontend system, the search query element being related to a business domain and being associated to at least one type of relevant information elements,
 in a second step, subsequent to the first step, the information queue element, being related to the type of relevant information elements associated to the search query element, is generated or initialized or instantiated,
 in a third step, subsequent to the second step, the content of the information queue element is fed to the at least one queue consumer element—out of the plurality of different queue consumer elements—related to the information queue element, wherein potentially relevant information elements are gathered or searched by the at least one queue consumer element,
 in a fourth step, subsequent to the third step, the potentially relevant information elements are fed to the processing element, wherein the processing element, by using information stored in the database element, performs a validation on the potentially relevant information elements to obtain information elements relevant with respect to the business domain and/or with respect to the at least one type of relevant information elements.

It is thereby advantageously possible according to the present invention that user-oriented information search and information gathering using a backend system and a frontend system is improved. Advantageously, the frontend system can comprise an application programming interface and/or a user interface enabling a user to choose and/or input a business domain (e.g., "cyber red teaming") of the user-oriented information search and at least one type of relevant information elements out of a plurality of different types of relevant information elements (e.g., Fully Qualified Domain Name (FQDN), Internet Protocol (IP) address, service, port, etc.). Advantageously, the backend system can comprise a plurality of information queue elements. Advantageously, the backend system can furthermore comprise a database element, a processing element, and at least one queue consumer element out of a plurality of different queue consumer elements, wherein each information queue element can be related to a type of relevant information elements out of the plurality of different types of relevant information elements, and wherein each information queue element can be related to at least one queue consumer element out of a plurality of different queue consumer elements. According to the present invention, it is possible that, in a first step, a search query element is provided, typically by a user of the frontend system, to the user interface of the frontend system, the search query element being related to a business domain and being associated to at least one type of relevant information elements. Furthermore, it is possible that, in a second step, subsequent to the first step, the information queue element, being related to the type of relevant information elements associated to the search query element, is generated or initialized or instantiated. For example, an information queue element can be created for each type of relevant information element provided by the user as well as for relevant combinations (of types) of relevant information elements provided by the user. The relevance of various combinations (of types) of relevant information elements provided by the user can be calculated based on specific machine learning algorithms, predefined rules, and/or advanced user settings. It is possible that, in a third step, subsequent to the second step, the content of the information queue element is fed to the at least one queue consumer element—out of the plurality of different queue consumer elements—related to the information queue element, wherein potentially relevant information elements are gathered or searched by the at least one queue consumer element. The queue consumer elements may also be able to perform scans and analyze data to obtain the potentially relevant information elements. Accordingly, e.g., a queue consumer element can be associated to at least one information queue element and/or to a plurality of information queue elements. It is also possible that, in a fourth step, subsequent to the third step, the potentially relevant information elements are fed to the processing element, wherein the processing element, by using information stored in the database element, performs a validation on the potentially relevant information elements to obtain information elements relevant with respect to the business domain and/or with respect to the at least one type of relevant information elements. During the validation it is, e.g., possible to check whether potentially relevant information elements are in scope, e.g., based on a dynamic scope defined by the user during a search operation (typically during the second, third and/or fourth step) and/or a static scope provided as an advanced setting (typically during the first step and typically by the user). Typically, the database allows for real-time search and/or aggregation. It is possible according to the present invention that the method is dynamic, i.e., the exact information queue elements and queue consumer elements that take part in the second, third and/or fourth step depend on the user input (i.e., the search query element, typically provided by the user in the first step and/or on an advanced setting, typically provided by the user in the first step).

Thereby, according to the present invention, the integration of many (known, existing) queue consumer elements is possible. Furthermore, the method can be open to proprietary information sources.

According to an embodiment of the present invention, the first, second, third and fourth steps are repeated, wherein especially the information elements relevant with respect to the business domain and/or with respect to the at least one type of relevant information elements are fed to the plurality of information queue elements.

It is therefore possible according to an embodiment of the present invention that the first, second, third and fourth steps are repeated. Therein, it is possible that the information elements relevant with respect to the business domain and/or with respect to the at least one type of relevant information elements (obtained during the fourth step) are fed to the plurality of information queue elements. Thus, an iterative process can be realized. However, at any iteration a search query element can be provided, typically by a user of the frontend system, and/or a prior search query element, provided typically by a user of the frontend system, can be changed, typically by a user of the frontend system. It is, e.g., possible that the first, second, third and fourth steps are iterated until all information elements relevant with respect to the business domain and/or with respect to the at least one type of relevant information elements are found and/or until a maximum number of iterations specified by the user is reached and/or until the user stops the iteration. Therefore, it is also possible that the (at least one) information queue element and the (at least one) queue consumer element taking part in the second, third and/or fourth step are different information queue elements out of the plurality of information queue elements and different queue consumer elements out of the plurality of queue consumer elements for different iterations (repetitions).

According to an embodiment of the present invention, the database element comprises at least one information storing element and optionally at least one information enrichment element, preferably a machine learning element and more preferably an artificial intelligence element.

It is therefore possible according to an embodiment of the present invention that the database element comprises an information storing element (e.g., a big data (database) element) as well as optionally at least one information enrichment element, preferably a machine learning element and more preferably an artificial intelligence element (or the database element has access to at least one of such elements).

According to an embodiment of the present invention, the processing element comprises an inbox element, a validator element, and an outbox element, wherein the potentially relevant information elements obtained by the queue consumer elements are first fed to the inbox element, then to the validator element, wherein the validator element performs the validation on the potentially relevant information elements to obtain the information elements relevant with respect to the business domain and/or with respect to the at least one type of relevant information elements, wherein the relevant information elements are fed to the outbox element in view of providing the relevant information elements to the plurality of information queue elements and/or to the database element.

Thereby, it is possible according to an embodiment of the present invention that the processing element comprises an inbox element, a validator element, and an outbox element, wherein the potentially relevant information elements obtained by the queue consumer elements during the third step are first fed to the inbox element and then to the validator element. Preferably, the potentially relevant information elements obtained by the queue consumer elements during the third step are parsed by the queue consumer elements or by a parser element before they are fed to the inbox element. The validator element can perform the validation on the potentially relevant information elements to obtain the information elements relevant with respect to the business domain and/or with respect to the at least one type of relevant information elements. Thus, it is possible to validate whether potentially relevant information elements are relevant with respect to the business domain and/or with respect to the at least one type of relevant information elements. Accordingly, typically after the validation, the relevant information elements can be fed to the outbox element in view of providing the relevant information elements to the plurality of information queue elements and/or to the database element. Thus, a further iteration becomes possible and/or information is transferred to the database element. The user input (i.e., the search query information) can advantageously influence how the validator element works.

According to an embodiment of the present invention, the processing element comprises a raw inbox element, a parser element, a polished inbox element, a validator element, and an outbox element, wherein the potentially relevant information elements obtained by the queue consumer elements are first fed to the raw inbox element, then to the parser element, then to the polished inbox element, then to the validator element, wherein the validator element performs the validation on the potentially relevant information elements to obtain the information elements relevant with respect to the business domain and/or with respect to the at least one type of relevant information elements, wherein the relevant information elements are fed to the outbox element in view of providing the relevant information elements to the plurality of information queue elements and/or to the database element.

Thereby, it is possible according to an embodiment of the present invention that the processing element comprises a raw inbox element, a parser element, a polished inbox element, a validator element, and an outbox element. Accordingly, the queue consumer elements can directly transfer the potentially relevant information elements to a raw inbox element (i.e., without parsing by the queue consumer elements). From the raw inbox element, the potentially relevant information elements can be transferred to the parser element, wherein the potentially relevant information elements can be parsed (and also potentially enriched). Then, the parsed potentially relevant information elements can be transferred to the polished inbox. The parser element can be dynamically (re-)configured to match changing user interests in terms of types of relevant information elements. That is, if the user wants to have a new type of relevant information element in the results (and inputs corresponding information during the first, second, third and/or fourth step), the parser element is adjusted—on the fly—to generate this new type of relevant information element in its output. The user input (e.g., the search query information) can advantageously influence how the parser element and validator element work.

According to an embodiment of the present invention, the information elements that are relevant with respect to the business domain and/or with respect to the at least one type of relevant information elements are continuously generated via repeatedly performing the first, second, third and fourth steps, wherein especially the machine learning element within the database element provides propositions to enhance the user-oriented information search and information gathering.

Thereby, it is possible that database element (or an element comprised in the database element) provides propositions to enhance the user-oriented information search and information gathering, which improves the possibilities for the user to enhance the information gathering, e.g., by adapting a search query element that is provided, typically by a user of the frontend system, to the user interface of the frontend system.

According to an embodiment of the present invention, the queue consumer elements correspond to existing and/or new—on-premise and/or in the cloud—active and/or passive information gathering engines.

Thereby, it is possible according to an embodiment of the present invention that an existing or new information gathering engine (e.g., search engine) or a plurality of different existing and/or new information gathering engines are incorporated into the method as queue consumer elements. This is advantageous since it makes the method particularly flexible and powerful.

According to an embodiment of the present invention, the user has—at any time during, before or after the first, second, third and/or fourth step—the opportunity to add and/or remove queue consumer elements to and/or from the plurality of different queue consumer elements. Preferably, the user also has the opportunity to add and/or remove queue consumer elements to and/or from the plurality of different queue consumer elements between different iterations.

According to an embodiment of the present invention, after the fourth step, the information elements relevant with respect to the business domain and/or with respect to the at least one type of relevant information elements are displayed to the user, preferably by transmitting the information elements relevant with respect to the business domain and/or with respect to the at least one type of relevant information elements from the backend system to the frontend system, preferably from the processing element to the frontend system, more preferably from the outbox element to the frontend system, and displaying the information elements relevant with respect to the business domain and/or with respect to the at least one type of relevant information elements on a panel related to the frontend system and/or to the user interface of the frontend system.

According to an embodiment of the present invention, after every iteration, preferably after every iteration of the fourth step, the information elements relevant with respect to the business domain and/or with respect to the at least one type of relevant information elements are displayed to the user, preferably by transmitting the information elements relevant with respect to the business domain and/or with respect to the at least one type of relevant information elements from the backend system to the frontend system, preferably from the processing element to the frontend system, more preferably from the outbox element to the frontend system, and displaying the information elements relevant with respect to the business domain and/or with respect to the at least one type of relevant information elements on a panel related to the frontend system and/or to the user interface of the frontend system.

According to an embodiment of the present invention, the information elements relevant with respect to the business domain and/or with respect to the at least one type of relevant information elements are displayed to the user, preferably by transmitting the information elements relevant with respect to the business domain and/or with respect to the at least one type of relevant information elements from the backend system to the frontend system, preferably from the processing element to the frontend system, more preferably from the outbox element to the frontend system, and displaying the information elements relevant with respect to the business domain and/or with respect to the at least one type of relevant information elements on a panel related to the frontend system and/or to the user interface of the frontend system, only after all information elements relevant with respect to the business domain and/or with respect to the at least one type of relevant information elements are obtained (after the fourth step) and/or until a maximum number of iterations specified by the user is reached and/or until the user stops the iterations.

According to an embodiment of the present invention, the plurality of information queue elements correspond to an intermediate storage of information queues, each information queue element being related to a type of relevant information elements, wherein such a type of relevant information elements correspond to a specific type of search engine input data, such as, e.g., corresponding to Fully Qualified Domain Names (FQDN), Internet Protocol (IP) addresses, and/or Internet Protocol (IP) addresses and port information, internet protocol services or the like. The information queue elements relate to queues of such search engine input data (or information elements of that type), i.e. a list (or queue) of different search strings, wherein each search string (of an information queue element considered) correspond to the specific type of search engine input data (or type of relevant information elements) related to that information queue element. That means that a first information queue element might be directed or related to the search engine input data type (or information elements of that type) of FQDN information, a second information queue element might be directed or related to the search engine input data type (or information elements of that type) of Internet Protocol (IP) addresses, and a third information queue element might be directed or related to the search engine input data type (or information elements of that type) of Internet Protocol (IP) addresses and port information.

According to that embodiment of the present invention, the plurality of queue consumer elements correspond to more or less specialized search engines (e.g., a DNS lookup search engine (i.e. a search engine querying the Domain Name System (DNS) to determine the domain name associated with an IP address) and/or an ONAPSIS OSP security platform search engine), each of these search engines being related to at least one information queue element in the sense that the search strings (or search engine input data or information elements of the corresponding type) of the queue of search engine input data elements of at least one information queue element are successively fed to the respective queue consumer element (being related to that information queue element). This means that the use of the corresponding search engine is conducted in an automated manner based on the list (or queue) of different search strings that are stored (or present) in the considered information queue element, i.e. each search string (being present (at a given point in time) in the information queue element considered) corresponds to the specific type of search engine input data (or type of relevant information elements) related to that information queue element, and the first one of these search strings (or search engine input data type or information elements of that type) in the queue (or list of that information queue element) is provided to the corresponding queue consumer element such that the queue consumer element (or specialized search engine) performs a search engine operation, typically providing result data (of that search engine operation and related to the considered search string). The result data (related to the first search string) correspond to the potentially relevant information element (of that first search string and related to the considered information queue element) that is fed to the processing element. After the first one of these search strings in the queue (or list of that information queue element) has been processed (or consumed) by the respective search engine, the first search string is deleted or removed in that information queue element, and the second one of these search strings in the queue (or list) becomes the first and is, hence, processed, i.e. provided to the corresponding queue consumer element such that this queue consumer element (or specialized search engine) performs the search engine operation again (but related to the previously second search string which is now the first one in the queue or list), and typically providing result data of that search engine operation. As a result, data related to the previously second search string (which is now the first one in the queue or list) is equally part of the potentially relevant information elements related to the considered information queue element, and it is likewise fed to the processing element. In this manner, all queue elements (or list entries) of the considered information queue element (i.e. corresponding to a type of relevant information elements) are treated and consumed by the corresponding queue consumer elements, leading—via the search engine operations of the corresponding queue consumer element (or specialized search engine)—to the potentially relevant information elements (of this considered combination of information queue element and queue consumer element) which is fed to the processing element. This process is performed—especially continuously and repeatedly in case that new search strings (or search engine input data or information elements of the corresponding type) are appended to the respective information queue elements—for all information queue elements of the other information queue elements and related queue consumer elements, providing the potentially relevant information being fed to the processing element. In the second step, based a search query element provided to the user interface of the frontend system, the information queue element or the plurality of information queue elements is/are generated or initialized or instantiated (i.e. filled with an initial set of information elements or search strings). In the third step, the queue consumer element or the plurality of queue consumer elements is/are fed with the search strings as explained above and potentially relevant information elements are searched or gathered or retrieved. In the fourth step, these potentially relevant information elements are fed to the processing element, and a validation is performed to obtain information elements relevant with respect to the business domain and/or with respect to the at least one type of relevant information elements. These obtained information elements—relevant with respect to the business domain and/or with respect to the at least one type of relevant information elements—are preferably used, in an iterative manner, as seed information to be fed to the information queue elements, and the third and fourth steps are repeated iteratively. Hence, according to an embodiment of the present invention, the third and fourth steps are repeated, wherein especially the information elements relevant with respect to the business domain and/or with respect to the at least one type of relevant information elements are fed to the plurality of information queue elements.

As already said, the potentially relevant information are provided (or fed) to the processing element of the backend system, and the processing element performs—typically based on information stored in the database element—a validation on the potentially relevant information elements to obtain information elements relevant with respect to the business domain and/or with respect to the at least one type of relevant information elements. Such relevant information elements correspond to structured information elements (preferably of different types), wherein each type of such structured information elements comprise a plurality of different atomic information elements. These atomic information elements are obtained, by the processing element, via a parsing operation, wherein the potentially relevant information elements (generated or provided by the queue consumer elements) are fed first to a raw inbox element (comprised in the processing element), in a non-parsed manner, and then passed from the raw inbox element to a parser element (comprised in the processing element), the parser element parsing the potentially relevant information elements. After parsing, the parsed potentially relevant information elements are passed from the parser element to the polished inbox element (or parsed inbox element, likewise comprised in the processing element). Via the parsing process, the atomic information elements are generated or detected, based on a set of parsing rules through which the parser element is configured. From the polished inbox element (or parsed inbox element), the parsed potentially relevant information elements (or the parsed atomic information elements) are passed on to the validator element. The validator element accesses information stored in the database element and uses this information to perform a validation on the atomic information elements or (parsed) potentially relevant information elements in order to obtain information elements relevant with respect to the business domain and/or with respect to the at least one type of relevant information elements. In case that an atomic information element is found detected or retrieved that is not known to the database, this atomic element is typically used to continue the iterative process according to the present invention, i.e. it is fed back to the respective information queue element related to the type of the atomic information element.

In the database element, typically different types of relevant information are stored, each type of relevant information having a certain pre-defined structure and typically comprising a plurality of atomic information elements (as well as, typically, meta information such a time stamp information related to the point in time when the respective search engine has processed or performed that search, additional pieces of information, e.g. related to the information source (and/or search engine) that provided that information (or atomic information element), especially also with an indication through which search string that information (or atomic information element) has been obtained). The behavior of exemplary embodiments of the inventive method, especially related to performing iterations of the various steps, especially the third step and the fourth step, is based on these pieces of structured information stored in the database element. E.g., one part or portion of the database element stores or is related to the (completely) formed pieces of structured information, typically corresponding to the information elements relevant with respect to the business domain and/or with respect to the at least one type of relevant information elements. Typically, another part or portion of the database element stores or is related to the pending pieces of structured information, i.e. pieces of structured information lacking at least part of the atomic information elements and, hence, for which a further search and validation step (i.e. third and fourth steps) is performed. Typically, still another part or portion of the database element stores or is related to the unprocessed pieces of structured information, i.e. pieces of structured information lacking all atomic information elements (and, hence, for which a search and validation step (i.e. third and fourth steps) needs to be performed in order to complete such pieces of structured information. Typically, still another part or portion of the database element stores or is related to the archived pieces of structured information, i.e. pieces of structured information (either lacking atomic information elements or being complete) having been the result of earlier searches.

In an exemplary embodiment, the present invention provides a system for enhanced and user-oriented information search and information gathering using a backend system and a frontend system, wherein the system comprises the backend system and the frontend system,
wherein the frontend system comprises an application programming interface and/or a user interface enabling a user to choose and/or to input
   a business domain of the user-oriented information search and information gathering, and
   at least one type of relevant information elements out of a plurality of different types of relevant information elements,
wherein the backend system comprises a plurality of information queue elements, a database element, a processing element, and at least one queue consumer element out of a plurality of different queue consumer elements, wherein each information queue element is related to a type of relevant information elements out of the plurality of different types of relevant information elements, and wherein each information queue element is related to at least one queue consumer element out of a plurality of different queue consumer elements, wherein the system is configured such that:

a search query element is provided, typically by a user of the frontend system, to the user interface of the frontend system, the search query element being related to a business domain and being associated to at least one type of relevant information elements,
   the information queue element, being related to the type of relevant information elements associated to the search query element, is generated or initialized or instantiated,
   the content of the information queue element is fed to the at least one queue consumer element—out of the plurality of different queue consumer elements—related to the information queue element, wherein potentially relevant information elements are gathered or searched by the at least one queue consumer element,
   the potentially relevant information elements are fed to the processing element, wherein the processing element, by using information stored in the database element, performs a validation on the potentially relevant information elements to obtain information elements relevant with respect to the business domain and/or with respect to the at least one type of relevant information elements.

It is thereby advantageously possible according to the present invention that user-oriented information search and information gathering using a backend system and a frontend system is improved. Advantageously, the frontend system can comprise an application programming interface and/or a user interface enabling a user to choose and/or input a business domain (e.g., "cyber red teaming") of the user-oriented information search and at least one type of relevant information elements out of a plurality of different types of relevant information elements (e.g., Fully Qualified Domain Name (FQDN), Internet Protocol (IP) address, service, port, etc.). Advantageously, the backend system can comprise a plurality of information queue elements. Advantageously, the backend system can furthermore comprise a database element, a processing element, and at least one queue consumer element out of a plurality of different queue consumer elements, wherein each information queue element can be related to a type of relevant information elements out of the plurality of different types of relevant information elements, and wherein each information queue element can be related to at least one queue consumer element out of a plurality of different queue consumer elements. According to the present invention, it is possible that, in a first step, a search query element is provided, typically by a user of the frontend system, to the user interface of the frontend system, the search query element being related to a business domain and being associated to at least one type of relevant information elements. Furthermore, it is possible that, in a second step, subsequent to the first step, the information queue element, being related to the type of relevant information elements associated to the search query element, is generated or initialized or instantiated. For example, an information queue element can be created for each type of relevant information element provided by the user as well as for relevant combinations (of types) of relevant information elements provided by the user. The relevance of various combinations (of types) of relevant information elements provided by the user can be calculated based on specific machine learning algorithms, predefined rules, and/or advanced user settings. It is possible that, in a third step, subsequent to the second step, the content of the information queue element is fed to the at least one queue consumer element—out of the plurality of different queue consumer elements—related to the information queue element, wherein potentially relevant information elements are gathered or searched by the at least one queue consumer element. The queue consumer elements may also be able to perform scans and analyze data to obtain the potentially relevant information elements. Accordingly, e.g., a queue consumer element can be associated to at least one information queue element and/or to a plurality of information queue elements. It is also possible that, in a fourth step, subsequent to the third step, the potentially relevant information elements are fed to the processing element, wherein the processing element, by using information stored in the database element, performs a validation on the potentially relevant information elements to obtain information elements relevant with respect to the business domain and/or with respect to the at least one type of relevant information elements. During the validation it is, e.g., possible to check whether potentially relevant information elements are in scope, e.g., based on a dynamic scope defined by the user during a search operation (typically during the second, third and/or fourth step) and/or a static scope provided as an advanced setting (typically during the first step and typically by the user). Typically, the database allows for real-time search and/or aggregation. It is possible according to the present invention that the method is dynamic, i.e., the exact information queue elements and queue consumer elements that take part in the second, third and/or fourth step depend on the user input (i.e., the search query element, typically provided by the user in the first step and/or on an advanced setting, typically provided by the user in the first step).

Consequently, according to the present invention, the integration of many existing search engines as queue consumer elements into exemplary embodiments of the inventive system is possible. Furthermore, the system can be open to proprietary information sources.

In an exemplary embodiment, the present invention provides a program comprising a computer readable program code which, when executed on a computer or on a frontend system or a part thereof or on a backend system or a part thereof, or in part on a front end system or a part thereof and in part on a backend system or a part thereof, causes the computer or the frontend system or the backend system to perform a method according to an embodiment of the present invention.

In an exemplary embodiment, the present invention provides a computer program product for enhanced and user-oriented information search and information gathering using a backend system and a frontend system, the computer program product comprising a computer program stored on a storage medium, the computer program comprising program code which, when executed on a computer or on a frontend system or a part thereof or on a backend system or a part thereof, or in part on a front end system or a part thereof and in part on a backend system or a part thereof, causes the computer or the frontend system or the backend system to perform a method according to an embodiment of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a flow diagram according to an embodiment of the present invention is schematically illustrated. In particular, a backend system 200 and a frontend system 100 are illustrated, wherein the frontend system 100 comprises a user interface enabling a user to choose a business domain of the user-oriented information search and information gathering and at least one type of relevant information elements out of a plurality of different types of relevant information elements.

The backend system 200 comprises a plurality of information queue elements 220, a database element 280, a processing element 250, and at least one queue consumer element out of a plurality of different queue consumer elements 230. The database element 280 comprises a machine learning element and a big data element. Each information queue element 220 is related to a type of relevant information elements out of the plurality of different types of relevant information elements and each information queue element 220 is related to at least one queue consumer element out of a plurality of different queue consumer elements 230. The processing element 250 comprises an inbox element 251, a validator element 252, and an outbox element 253. In a first step, a search query element is provided by a user of the frontend system 100, to the user interface of the frontend system 100. The search query element is related to a business domain and is associated to at least one type of relevant information elements. In a second step, subsequent to the first step, the information queue element 220, being related to the type of relevant information elements associated to the search query element, is generated or initialized or instantiated. In a third step, subsequent to the second step, the content of the information queue element 220 is fed to the at least one queue consumer element—out of the plurality of different queue consumer elements 230—related to the information queue element 220, wherein potentially relevant information elements are gathered and/or searched (and also possibly analyzed and scanned) by the at least one queue consumer element. The potentially relevant information elements are parsed (and potentially enriched) by the information queue elements 230 or by a parser element that is associated to the information queue elements 230. In a fourth step, subsequent to the third step, the (parsed) potentially relevant information elements are fed to the inbox element 251, comprised in the processing element 250. Next, the potentially relevant information elements are passed from the inbox element 251 to the validator element 252, comprised in the processing element 250. Consequently, the validator element 252 accesses information stored in the database element 280 and uses this information to perform a validation on the potentially relevant information elements in order to obtain information elements relevant with respect to the business domain and/or with respect to the at least one type of relevant information elements. Next, the information elements relevant with respect to the business domain and/or with respect to the at least one type of relevant information elements are passed from the validator element 252 to the outbox element 253 of the processing element 250. Via the outbox element 253 the relevant information elements (i.e., the information elements relevant with respect to the business domain and/or with respect to the at least one type of relevant information elements) are provided to the plurality of information queue elements 220 and/or to the database element 280 and/or the frontend system (and consequently displayed to the user). Now information queue elements 220 that are related to the relevant information elements provided by the outbox element 253 are generated or initialized or instantiated and a further iteration starts (unless all information elements relevant with respect to the business domain and/or with respect to the at least one type of relevant information elements are obtained and/or until a maximum number of iterations specified by the user is reached and/or until the user stops the iteration). Optionally, when the further iteration starts (with a further first step or with a further second step or with a further third step), also further search query elements are provided by a user as well. In this case, in this further iteration, not only the information queue elements 220 that are related to the relevant information elements provided by the outbox element 253 are generated or initialized or instantiated, but also the information queue elements 220 that are related to the further search query elements provided by the user. Thus, it is possible that the (at least one) information queue element and the (at least one) queue consumer element taking part in the second, third and/or fourth step are different information queue elements out of the plurality of information queue elements and different queue consumer elements out of the plurality of queue consumer elements for different iterations (i.e., different in a first/second/third step and in a further first/second/third step). After every iteration, particularly after every iteration of the fourth step, the information elements relevant with respect to the business domain and/or with respect to the at least one type of relevant information elements are displayed to the user, preferably by transmitting the information elements relevant with respect to the business domain and/or with respect to the at least one type of relevant information elements from the backend system 200 to the frontend system 100 (i.e. from the processing element 250 to the frontend system 100) and displaying the information elements relevant with respect to the business domain and/or with respect to the at least one type of relevant information elements on a panel related to the frontend system 100 and/or to the user interface of the frontend system 100.

Figure 2:
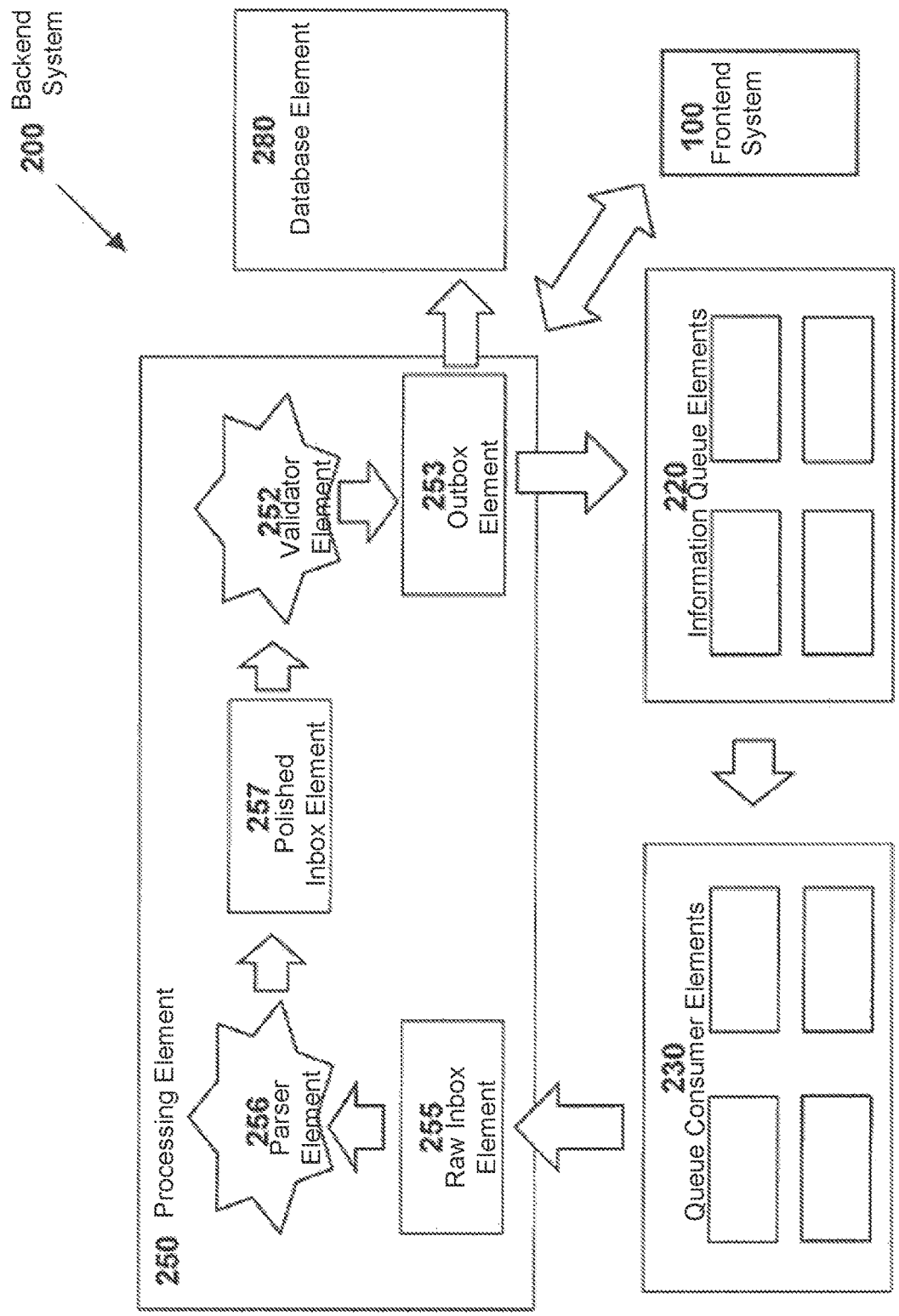
FIG. 2 schematically illustrates a further flow diagram according to a further embodiment of the present invention.

In FIG. 2 a further flow diagram according to a further embodiment of the present invention is schematically illustrated. In particular, a backend system 200 and a frontend system 100 are illustrated, wherein the frontend system 100 comprises a user interface enabling a user to choose a business domain of the user-oriented information search and information gathering, and at least one type of relevant information elements out of a plurality of different types of relevant information elements.

The backend system 200 comprises a plurality of information queue elements 220, a database element 280, a processing element 250, and at least one queue consumer element out of a plurality of different queue consumer elements 230. The database element 280 comprises a machine learning element and a big data element. Each information queue element 220 is related to a type of relevant information elements out of the plurality of different types of relevant information elements and each information queue element 220 is related to at least one queue consumer element out of a plurality of different queue consumer elements 230. The processing element 250 comprises a raw inbox element 255, a parser element 256, a polished inbox element 257, a validator element 252, and an outbox element 253. In a first step, a search query element is provided by a user of the frontend system 100, to the user interface of the frontend system 100. The search query element is related to a business domain and is associated to at least one type of relevant information elements. In a second step, subsequent to the first step, the information queue element 220, being related to the type of relevant information elements associated to the search query element, is generated or initialized or instantiated. In a third step, subsequent to the second step, the content of the information queue element 220 is fed to the at least one queue consumer element—out of the plurality of different queue consumer elements 230—related to the information queue element 220, wherein potentially relevant information elements are gathered and/or searched (and also possibly analyzed and scanned) by the at least one queue consumer element. In a fourth step, subsequent to the third step, the potentially relevant information elements are fed to the raw inbox element 255, comprised in the processing element 250, in a non-parsed way. Next, the potentially relevant information elements are passed from the raw inbox element 255 to the parser element 256, comprised in the processing element 250, wherein the potentially relevant information elements are parsed. Consequently, the parsed potentially relevant information elements are passed from the parser element 256 to the polished inbox element 257, comprised in the processing element 250. From the polished inbox element 257 the parsed potentially relevant information elements are passed on to the validator element 252. The validator element 252 accesses information stored in the database element 280 and uses this information to perform a validation on the (parsed) potentially relevant information elements in order to obtain information elements relevant with respect to the business domain and/or with respect to the at least one type of relevant information elements. Next, the information elements relevant with respect to the business domain and/or with respect to the at least one type of relevant information elements are passed from the validator element 252 to the outbox element 253 of the processing element 250. Via the outbox element 253 the relevant information elements (i.e., the information elements relevant with respect to the business domain and/or with respect to the at least one type of relevant information elements) are provided to the plurality of information queue elements 220 and/or to the database element 280 and/or the frontend system (and consequently to the user). Now information queue elements 220 that are related to the relevant information elements provided by the outbox element 253 are generated or initialized or instantiated and a further iteration starts (unless all information elements relevant with respect to the business domain and/or with respect to the at least one type of relevant information elements are obtained and/or until a maximum number of iterations specified by the user is reached and/or until the user stops the iteration). Optionally, when the further iteration starts (with a further first step or with a further second step or with a further third step), also further search query elements are provided by a user as well. In this case, in this further iteration, not only the information queue elements 220 that are related to the relevant information elements provided by the outbox element 253 are generated or initialized or instantiated, but also the information queue elements 220 that are related to the further search query elements provided by the user. Thus, it is possible that the (at least one) information queue element and the (at least one) queue consumer element taking part in the second, third and/or fourth step are different information queue elements out of the plurality of information queue elements and different queue consumer elements out of the plurality of queue consumer elements for different iterations (i.e., different in a first/second/third step and in a further first/second/third step). After every iteration of the method, particularly after every iteration of the fourth step, the information elements relevant with respect to the business domain and/or with respect to the at least one type of relevant information elements are displayed to the user, preferably by transmitting the information elements relevant with respect to the business domain and/or with respect to the at least one type of relevant information elements from the backend system 200 to the frontend system 100 (i.e. from the processing element 250 to the frontend system 100) and displaying the information elements relevant with respect to the business domain and/or with respect to the at least one type of relevant information elements on a panel related to the frontend system 100 and/or to the user interface of the frontend system 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for user-oriented information search and information gathering using a backend system and a frontend system, wherein the method comprises the following steps:
   in a first step, receiving, by the frontend system, a search query, wherein the search query is related to a business domain and associated with a plurality of types of search engine input data provided by the user;
   in a second step, subsequent to the first step, generating, initializing or instantiating, by the backend system, a plurality of queues of search strings corresponding to the plurality of types of search engine input data associated with the search query, wherein a respective queue of search strings is created for each type of search engine input data provided by the user and for one or more combinations of types of search engine input data provided by the user;
   in a third step, subsequent to the second step, feeding, by the backend system, content of the plurality of queues of search strings to at least one search engine of the backend system corresponding to the plurality of queues of search strings, wherein potentially relevant search results are obtained by the at least one search engine; and
   in a fourth step, subsequent to the third step, feeding, by the backend system, the potentially relevant search results to a processing device of the backend system, wherein the processing device, by using information stored in a database of the backend system, performs validation on the potentially relevant search results to obtain search results which are relevant to the business domain and the plurality of types of search engine input data.

2. The method according to claim 1, wherein the first, second, third and fourth steps are repeated, and wherein the search results relevant to the business domain to and the plurality of types of search engine input data are fed to the plurality of queues of search strings.

3. The method according to claim 1, wherein search results are continuously generated via repeatedly performing the first, second, third and fourth steps.

4. The method according to claim 1, wherein the processing device comprises an inbox, a validator, and an outbox, wherein the potentially relevant search results are first fed to the inbox, and then to the validator, wherein the validator performs the validation on the potentially relevant search results to obtain the search results relevant to the business domain and to the plurality of types of search engine input data, wherein the search results are fed to the outbox for providing the search results relevant information to the plurality of queues of search strings and/or to the database.

5. The method according to claim 1, wherein the processing device comprises a raw inbox, a parser, a polished inbox, a validator, and an outbox, wherein the potentially relevant search results obtained by the at least one search engine are first fed to the raw inbox, then to the parser, then to the polished inbox, then to the validator, wherein the validator performs the validation on the potentially relevant search results to obtain the search results relevant to the business domain and to the plurality of types of search engine input data, wherein the search results are fed to the outbox for providing the search results to the plurality of queues of search strings information queue elements and/or to the database.

6. A system for user-oriented information search and information gathering, wherein the system comprises:
   a backend system, comprising a database, a processing device, and a plurality of search engines; and
   a frontend system;
   wherein the frontend system is configured to receive a search query, wherein the search query is related to a business domain and associated with a plurality of types of search engine input data;
   wherein the backend system is configured to:

generate, initialize or instantiate a plurality of queues of search strings corresponding to the plurality of types of search engine input data associated with the search query, wherein a respective queue of search strings is created for each type of search engine input data provided by the user and for one or more combinations of types of search engine input data provided by the user;

feed content of the plurality of queues of search strings to at least one search engine of the backend system corresponding to the plurality of queues of search strings, wherein potentially relevant search results are obtained by the at least one search engine; and feed the potentially relevant search results to a processing device of the backend system, wherein the processing device is configured to perform, by using information stored in a database of the backend system, validation on the potentially relevant search results to obtain search results which are relevant to the business domain and the plurality of types of search engine input data.

7. One or more non-transitory computer-readable media having processor-executable instructions stored thereon for user-oriented information search and information gathering using a backend system and a frontend system, wherein the processor-executable instructions, when executed, facilitate the following steps:

in a first step, receiving, by the frontend system, a search query, wherein the search query is related to a business domain and associated with a plurality of types of search engine input data provided by the user;

in a second step, subsequent to the first step, generating, initializing, or instantiating, by the backend system, a plurality of queues of search strings corresponding to the plurality of types of search engine input data associated with the search query, wherein a respective queue of search strings is created for each type of search engine input data provided by the user and for one or more combinations of types of search engine input data provided by the user;

in a third step, subsequent to the second step, feeding, by the backend system, content of the plurality of queues of search strings to at least one search engine of the backend system corresponding to the plurality of queues of search strings, wherein potentially relevant search results are obtained by the at least one search engine; and in a fourth step, subsequent to the third step, feeding, by the backend system, the potentially relevant search results to a processing device of the backend system, wherein the processing device, by using information stored in a database of the backend system, performs validation on the potentially relevant search results to obtain search results which are relevant to the business domain and the plurality of types of search engine input data.

* * * * *